United States Patent
Kneafsey et al.

(10) Patent No.: US 8,202,932 B2
(45) Date of Patent: *Jun. 19, 2012

(54) ADHESIVE BONDING SYSTEMS HAVING ADHERENCE TO LOW ENERGY SURFACES

(75) Inventors: Brendan J. Kneafsey, Lucan (IE); Edward Patrick Scott, Templeoque (IE); Rachel Miriam Hersee, Drimnagh (IE)

(73) Assignee: Loctite (R&D) Limited, Dublin (IE)

( * ) Notice: Subject to any disclaimer, the term of this patent is extended or adjusted under 35 U.S.C. 154(b) by 1430 days.

This patent is subject to a terminal disclaimer.

(21) Appl. No.: 11/003,958

(22) Filed: Dec. 3, 2004

(65) Prior Publication Data

US 2006/0122319 A1    Jun. 8, 2006

(51) Int. Cl.
*C08L 31/00* (2006.01)
*C08F 4/12* (2006.01)
*C08F 4/44* (2006.01)
*C08F 4/52* (2006.01)

(52) U.S. Cl. ............ 524/556; 526/195; 526/124.6; 526/196; 526/204; 526/217; 428/500

(58) Field of Classification Search ........ 526/195, 526/124.6, 196, 204, 217; 524/556; 428/500
See application file for complete search history.

(56) References Cited

U.S. PATENT DOCUMENTS

| | | | |
|---|---|---|---|
| 3,236,823 A | 2/1966 | Jennes et al. | 260/80.5 |
| 3,275,611 A | 9/1966 | Mottus et al. | 260/80.5 |
| 3,661,744 A | 5/1972 | Kehr et al. | 204/159.14 |
| 3,898,349 A | 8/1975 | Kehr et al. | 427/36 |
| 4,008,340 A | 2/1977 | Kung et al. | 426/651 |
| 4,018,851 A | 4/1977 | Baccei | 260/859 |
| 4,092,376 A | 5/1978 | Douek et al. | 260/884 |
| 4,133,789 A * | 1/1979 | Lakshmanan | 156/322 |
| 4,215,209 A | 7/1980 | Ray-Chaudhuri et al. | 526/292 |
| 4,295,909 A | 10/1981 | Baccei | 156/307.3 |
| 4,515,724 A | 5/1985 | Ritter | 260/410 |
| 4,536,546 A | 8/1985 | Briggs | 525/83 |
| 4,638,092 A | 1/1987 | Ritter | 568/1 |
| 4,639,498 A | 1/1987 | Ritter | 526/196 |
| 4,676,858 A | 6/1987 | Ritter | 156/307.3 |
| 4,772,530 A | 9/1988 | Gottschalk et al. | 430/138 |
| 4,772,541 A | 9/1988 | Gottschalk et al. | 430/339 |
| 4,808,638 A | 2/1989 | Steinkraus et al. | 522/24 |
| 4,921,921 A | 5/1990 | Ritter | 526/195 |
| 4,942,201 A | 7/1990 | Briggs et al. | 525/71 |
| 4,950,581 A | 8/1990 | Koike et al. | 430/281 |
| 4,963,220 A | 10/1990 | Bachmann et al. | 156/307.3 |
| 5,106,928 A | 4/1992 | Skoultchi et al. | 526/196 |
| 5,143,884 A | 9/1992 | Skoultchi et al. | 502/160 |
| 5,151,520 A | 9/1992 | Gottschalk et al. | 548/110 |
| 5,268,436 A | 12/1993 | Huver et al. | 526/216 |
| 5,286,821 A | 2/1994 | Skoultchi | 526/196 |
| 5,310,835 A | 5/1994 | Skoultchi et al. | 526/198 |
| 5,376,746 A | 12/1994 | Skoultchi | 526/196 |
| 5,539,070 A | 7/1996 | Zharov et al. | 526/198 |
| 5,616,796 A | 4/1997 | Pocius et al. | 564/9 |
| 5,621,143 A | 4/1997 | Pocius | 564/8 |
| 5,681,910 A | 10/1997 | Pocius | 526/196 |
| 5,684,102 A | 11/1997 | Pocius et al. | 526/198 |
| 5,686,544 A | 11/1997 | Pocius | 526/196 |
| 5,718,977 A | 2/1998 | Pocius | 428/422 |
| 5,795,657 A | 8/1998 | Pocius et al. | 428/516 |
| 5,872,197 A | 2/1999 | Deviny | 526/196 |
| 5,883,208 A | 3/1999 | Deviny | 526/198 |
| 5,935,711 A | 8/1999 | Pocius et al. | 428/421 |
| 6,110,987 A | 8/2000 | Kamata et al. | 522/64 |
| 6,171,700 B1 | 1/2001 | Sugita et al. | 428/408 |
| 6,252,023 B1 | 6/2001 | Moren | 526/196 |
| 6,706,831 B2 | 3/2004 | Sonnenschein et al. | 526/196 |
| 6,710,145 B2 | 3/2004 | Sonnenschein et al. | 526/196 |
| 6,713,578 B2 | 3/2004 | Sonnenschein et al. | 526/196 |
| 6,713,579 B2 | 3/2004 | Sonnenschein et al. | 526/196 |
| 6,867,271 B1 * | 3/2005 | Maandi et al. | 526/195 |
| 2002/0025381 A1 | 2/2002 | Sonnenschein et al. | 427/372.2 |
| 2002/0028894 A1 | 3/2002 | Sonnenschein et al. | 526/198 |
| 2002/0031607 A1 | 3/2002 | Sonnenschein et al. | 427/372.2 |
| 2002/0033227 A1 | 3/2002 | Sonnenschein et al. | 156/306.9 |
| 2002/0195453 A1 | 12/2002 | McLeod | 220/562 |
| 2003/0044553 A1 | 3/2003 | Ramanathan et al. | 428/35.8 |
| 2003/0047268 A1 | 3/2003 | Korchnak et al. | 156/94 |
| 2003/0181611 A1 | 9/2003 | Sonnenschein et al. | 526/217 |
| 2004/0094976 A1 | 5/2004 | Cate et al. | 293/120 |
| 2004/0242812 A1 * | 12/2004 | Sonnenschein et al. | 526/124.6 |

FOREIGN PATENT DOCUMENTS

| | | |
|---|---|---|
| EP | 0 078 995 | 10/1982 |
| EP | A-0 356 875 | 8/1989 |
| JP | 73 01 8928 | 12/1969 |
| JP | 2000 327 683 | 11/2000 |
| WO | WO 97/17383 | 5/1997 |
| WO | WO 98/17694 | 4/1998 |
| WO | WO 99/64528 | 12/1999 |

(Continued)

OTHER PUBLICATIONS

Barton, D. and Ollis, W.D., "Comprehensive Organic Chemistry", vol. 3, Ch. 14, Ed. Jones, D.N., Pergamon Press (1979).

(Continued)

*Primary Examiner* — Michael M Bernshteyn
(74) *Attorney, Agent, or Firm* — Steven C. Bauman

(57) ABSTRACT

This invention relates to (meth)acrylate-based polymerizable compositions and adhesive systems prepared therefrom, which include a alkylated borohydride or tetraalkyl borane metal or ammonium salt and an amino silane or an amino silane capped polymer. The inventive compositions and adhesive systems are particularly well suited for bonding applications which involve at least one low energy bonding surface, for example, the polyolefins, polyethylene, and polypropylene.

25 Claims, 1 Drawing Sheet

FOREIGN PATENT DOCUMENTS

| | | |
|---|---|---|
| WO | WO 01/32716 | 5/2001 |
| WO | WO 01/44311 | 6/2001 |
| WO | WO 02/34582 | 5/2002 |
| WO | WO 02/34851 | 5/2002 |
| WO | WO 03/035703 | 5/2003 |
| WO | WO 03035703 A1 * | 5/2003 |
| WO | WO 03/089536 | 10/2003 |

OTHER PUBLICATIONS

Brown, Herbert C., Boranes in Organic Chemistry, "Free-Radical Reactins of Organoboranes", p. 433-439, Ithaca ad London (1972).

Pelter, A. and Smith, K., "Organic Boran Compounds", 689-708, 728-732, and 773-784, London (1972).

* cited by examiner

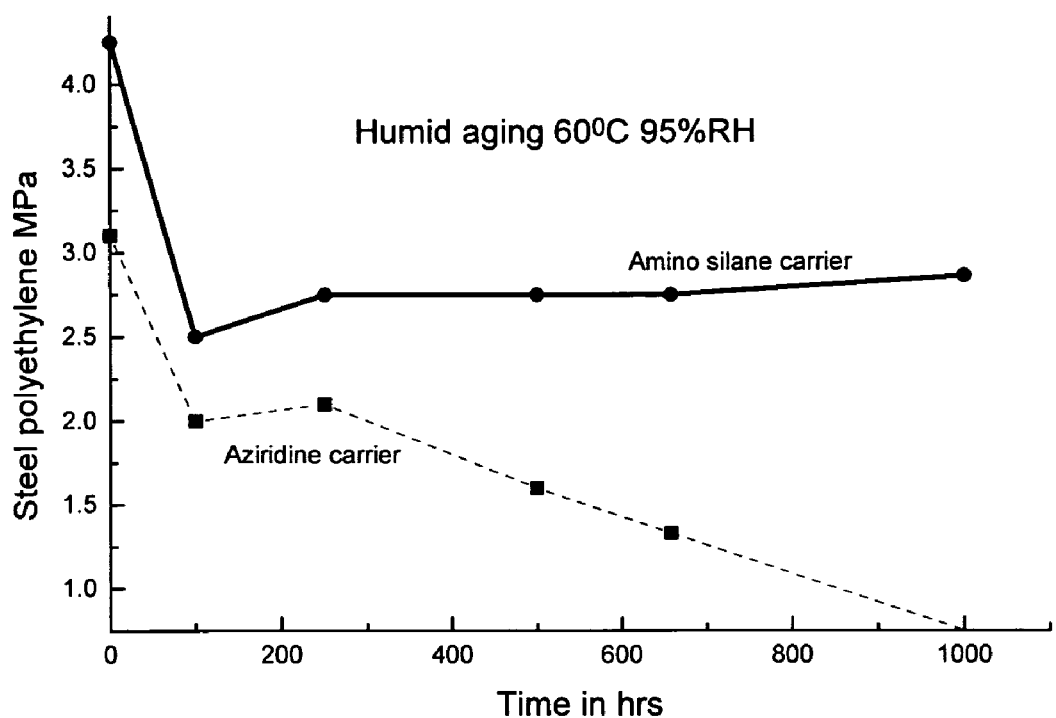

ADHESIVE BONDING SYSTEMS HAVING ADHERENCE TO LOW ENERGY SURFACES

BACKGROUND OF THE INVENTION

1. Field of the Invention

This invention relates to (meth)acrylate-based polymerizable compositions and adhesive systems prepared therefrom, which include an alkylated borohydride or tetraalkyl borane metal or ammonium salt and an amino silane or an amino silane capped polymer. The inventive compositions and adhesive systems are particularly well suited for bonding applications which involve at least one low energy bonding surface, for example, polyolefin surfaces, such as polyethylene and polypropylene.

2. Brief Description of Related Technology

Low energy surfaces such as polyolefins, i.e, polyethylene, polypropylene, polybutene, polyisoprene, and copolymers thereof, are well known to be difficult to bond to each other and to other surfaces using adhesive bonding technology since they have few active bonding sites available at the free surfaces. Low energy surfaces typically have surface energy values of less than 45 mJ/m$^2$, more typically less than 40 mJ/m$^2$, such as less than 35 mJ/m$^2$.

Bonding low energy surfaces by surface pre-treatments such as flame treatments, plasma treatments, oxidation, sputter etching, corona discharge, or primer treatments with a high surface energy material is well known. Such treatments disrupt the bonds at the surface of the low energy material providing sites which are reactive and which can participate in bonding reactions with adhesive materials. However, such surface pre-treatments are usually undesirable, in that they add cost to the process, they are not particularly reproducible in their results, and the effect of the pre-treatments wears off with time so the pre-treated surfaces must be re-pre-treated if they are not bonded within a reasonable period of time.

The chemistry of organic boron compounds has been studied in detail [see e.g. D. Barton and W. D. Ollis, "Comprehensive Organic Chemistry", Vol. 3, Part 14, Pergamon Press (1979) and H. C. Brown, *Boranes in Organic Chemistry*, Cornell University Press, Ithaca, N.Y. (1972)]. The use of organoboranes such as the trialkylboranes including triethylborane and tributylborane for initiating and catalyzing the polymerization of vinyl monomers is well known. However, such organoborane compounds are known to be flammable in air so that the compounds and compositions containing them require special handling and the compositions have poor shelf stability [see e.g. U.S. Pat. No. 3,236,823 (Jennes), and the Background section of U.S. Pat. No. 5,935,711 (Pocius), at col. 2].

Certain boron alkyl compounds and their use as initiators of polymerization are described in U.S. Pat. Nos. 4,515,724, 4,638,092, 4,638,498, 4,676,858 and 4,921,921, each to Ritter.

U.S. Pat. Nos. 5,106,928, 5,143,884, 5,286,821, 5,310,835 and 5,376,746, each disclose a two-part initiator system for acrylic adhesive compositions, in which the first part includes a reportedly stable organoborane amine complex and the second part includes a destabilizer or activator such as an organic acid or an aldehyde.

Japanese Patent Publication No. S48-18928 describes a method for adhering polyolefin or vinyl polymers using an adhesive obtained by adding trialkylboron to a vinyl monomer, with or without vinyl polymer. Examples of trialkylboron include triisopropylboron, tri-n-butylboron, tripropylboron and tri-tert-butylboron.

U.S. Pat. No. 3,275,611 (Mottus) describes a process for polymerizing unsaturated monomers with a catalyst comprising an organoboron compound, a peroxygen compound and an amine complexing agent for the boron compound.

It is well known that the bonding of polyolefin substrates and other low surface energy substrates causes particular difficulties. Attempts have been made to overcome these difficulties by the extensive and expensive substrate surface preparation described above, or by priming the surface with a high surface energy primer. However, it is desired to develop adhesive compositions, which will bond low surface energy substrates without such surface preparation.

U.S. Pat. No. 5,539,070 (Zharov), and U.S. Pat. Nos. 5,616,796, 5,621,143, 5,681,910, 5,684,102, 5,686,544, 5,718,977, 5,795,657 and the '711 patent describe organoborane amine complexes which can be used in systems that initiate the polymerization of acrylic monomers in compositions useful for bonding low surface energy plastics substrates such as polyethylene, polypropylene and polytetrafluoroethylene.

International Patent Publication No. WO 99/64528 describes low odor polymerizable compositions comprising monomer blends and organoborane amine complex initiators. These systems require the preparation of trialkyl borane amine complexes to achieve the desired performance and shelf stability. The manufacture of such complexes is an undesirably complicated process. Further, the presence of the amines results in cured adhesives that have a tendency to become yellow in color on aging.

International Patent Publication No. WO 01/44311 also describes amine organoborane complex polymerization initiators in bonding compositions for low surface energy substrates.

International Patent Publication No. WO 01/32716 ("PCT '716") acknowledges that while complexes of an organoborane and an amine may be useful in many applications, certain problems may arise due to the use of amine complexing agents in such conventional complexes. For example, when the complexes contain a primary amine, adhesives prepared therefrom may be prone to discoloration, such as yellowing; further, when including reactive diluents, such as aziridines described, for example, in International Patent Publication No. WO 98/17694, in compositions containing the complexes, the diluents may prematurely react with protic amines (i.e., those amines in which a nitrogen atom is bonded to at least one hydrogen atom) in such complexes, prematurely decomplexing the organoborane initiator.

PCT '716 therefore proposes a complex of an organoborane and a complexing agent of at least one hydroxide or alkoxide, particularly a complex represented by the formula

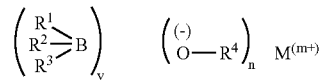

where $R^1$ is an alkyl group having 1 to about 10 carbon atoms; $R^2$ and $R^3$ may be the same or different and are selected from alkyl groups having 1 to about 10 carbon atoms and phenyl-containing groups; the value of "v" is selected so as to provide an effective ratio of oxygen atoms of the alkoxides and/or hydroxides to boron atoms in the complex; each $R^4$ is independently selected from hydrogen or an organic group (e.g., an alkyl or alkylene group); $M^{(m+)}$ represents a countercation [comprising a monovalent cation, such as a Group IA metal (e.g., lithium, sodium and potassium) cation or onium, or a multivalent cation, such as a Group IIA metal (e.g., calcium and magnesium) cation]; n is an integer greater than zero; and m is an integer greater than zero. Particular complexing agents are stated to have a countercation selected from sodium, potassium and tetraalkylammoniums. When any $R^4$ is hydrogen, the complexing agent is said to comprise at least one hydroxide. When any $R^4$ is an organic group, the complexing agent is said to comprise at least one alkoxide.

According to PCT '716, the complexing agent (i.e., the hydroxide or alkoxide) is used in the form of a salt. That is, the complexing agent is stabilized by a suitable countercation such that the complexing agent is capable of complexing the initiator. Thus, in the Formula, $M^{(m+)}$ represents a countercation that stabilizes the complexing agent, not a cation that forms an ionic compound with the organoborane initiator.

PCT '716 states that hydroxides and alkoxides provide strong coupling to organometallic initiators, such as organoboranes, with the resulting complexes having excellent oxidative stability. Thus, complexing agents of at least one hydroxide, alkoxide, or mixtures thereof are said to be particularly beneficial. Such a complex is stated to be a tightly co-ordinated salt formed by association of a Lewis acid (the initiator) and a Lewis base (the hydroxide or alkoxide). This indicates that the oxygen atom of the alkoxide or hydroxide is bonded or co-ordinated to the boron atom of the initiator.

Tetraorganylborate salts of tetraalkylammonium, sodium or lithium are known as photoinitiators in photocurable compositions for imaging materials (see e.g. U.S. Pat. Nos. 4,950, 581, 6,110,987 and 6,171,700). Tetraorganylborate salts do not however have a boron-hydrogen bond. The distinction between boron-hydrogen compounds, triorganylboranes and organoborate salts is well illustrated in D. Barton and W. D. Ollis, "Comprehensive Organic Chemistry", to which Chapters 14.2, 14.3 and 14.4 of Vol. 3 are devoted.

More recently, Loctite (R&D) Ltd. has designed and developed technology that is described in International Patent Publication Nos. WO 02/34851, WO 02/34852 and WO 2003/089536 relating generally to polymerizable adhesive compositions with a free radically polymerizable component and an initiator system of an alkyl borohydride with either a metal or ammonium cation. These compositions also describe the use of aziridine components.

And Henkel Corporation together with Loctite (R&D) Ltd. have designed and developed technology, which include a carrier to such polymerizable adhesive compositions so that the compositions have a flash point above 140° F. See International Patent Publication No. WO 03/035703.

The use of aziridines generally however are under regulatory scrutiny, and thus labelling requirements are imposed, which may be an impediment to wide spread usage.

Despite the work of many in this general field of bonding low energy services, there is a need for polymerizable compositions for bonding low surface energy substrates, such as polyolefins, and for end users to have a variety of such compositions which achieve that result through different technical strategies.

SUMMARY OF THE INVENTION

The present invention which is directed to a polymerizable composition, which includes a free radical polymerizable component, such as one based on (meth)acrylates, an alkylated borohydride or tetraalkyl borane metal or ammonium salt as defined below, and an amino silane or an amino silane capped polymer. The inventive compositions are particularly useful for bonding low surface energy substrates to a similar or different substrate.

BRIEF DESCRIPTION OF THE FIGURE

FIG. 1 depicts a graph showing humid aging resistance performance in two samples, one with an aziridine, and the other an amino silane, and the improved humid aging resistance achieved by the latter sample.

DETAILED DESCRIPTION OF THE INVENTION

For purposes of the present invention, the terms (meth) acrylate and (meth)acrylic are used synonymously with regard to the monomer and monomer-containing component, and these terms include acrylate, methacrylate, acrylic, and methacrylic.

The present invention relates to polymerizable (meth)acrylate compositions and adhesive systems based on such (meth) acrylate compositions, which when applied onto a substrate results in the formation of a polymeric material that strongly adheres to surfaces, particularly low energy surfaces such as polyolefins.

The speed and extent of the polymerization reaction can be controlled by varying the ratio of the various constituents. Adhesive systems of the present invention have shown average bond strengths to low energy surface materials (such as the polyolefins, polyethylene and polypropylene) in excess of about 4 MPas.

The polymerizable compositions disclosed herein are useful for bonding a large range of substrates including metals, plastics and glass to each other, or to different substrates. In addition to polyolefins (such as polyethylene and polypropylene), these low energy surfaces include, for example, acrylonitrile-butadiene-styrene, polytetrafluoroethylene and polycarbonate.

Also disclosed herein are kits comprising the (meth)acrylate compositions for use as adhesive systems, the resultant bonded assembly using the (meth)acrylate based adhesive system of the present invention, and a method of bonding low energy substrates with the (meth)acrylate based adhesive system of the present invention.

The ethylenically unsaturated, free radical polymerizable monomers useful in the present invention preferably comprise addition polymerizable, non-gaseous (boiling point above 100° C. at normal atmospheric pressure), ethylenically-unsaturated organic compounds containing at least one, and preferably at least two, terminal ethylenically unsaturated groups, and being capable of forming a high weight average molecular weight polymer by free radical initiated, chain propagating addition polymerization.

The (meth)acrylate component may be selected from mono (meth)acrylate monomers comprising formula I:

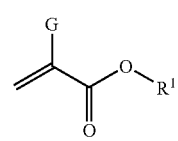

where G is hydrogen, halogen, or an alkyl having from 1 to 4 carbon atoms, $R^1$ has from 1 to 16 carbon atoms and is an alkyl, cycloalkyl, alkenyl, cycloalkenyl, alkaryl, aralkyl, or aryl group, optionally substituted or interrupted with silane, silicon, oxygen, halogen, carbonyl, hydroxyl, ester, carboxylic acid, urea, urethane, carbamate, amine, amide, sulfur, sulfonate, sulfone or tetrahydrafurfuryl, such as citronellyl (meth)acrylates, hydroxylethyl (meth)acrylates, hydroxypropyl (meth)acrylates, tetrahydrodicyclopentadienyl (meth) acrylate, triethylene glycol (meth)acrylates, and tetrahydrafurfuryl (meth)acrylates;

a di- or tri-(meth)acrylate monomers, such as those selected from polyethylene glycol di(meth)acrylates, bisphenol-A di(meth)acrylates, tetrahydrofurane di(meth)acrylates, hexanediol di(meth)acrylates, polythylene glycol di(meth)acrylates, such as triethylene glycol di(meth)acrylate, tripropylene glycol di(meth)acrylate, tetraethylene glycol di(meth)acrylate, diethylene glycol di(meth)acrylate, 1,4-butanediol di(meth)acrylate, 1,6-hexanediol di(meth)acrylate, pentaerythritol tetra(meth)acrylate, trimethylol propane tri(meth)acrylate, trimethylol propane tri(meth)acrylate, di-pentaerythritol monohydroxypenta(meth)acrylate, pentaerythritol tri(meth)acrylate, ethoxylated bisphenol-A di(meth)acrylate, ethoxylated trimethylolpropane tri(meth)acrylates, trimethylolpropane propoxylate tri(meth)acrylates, or combinations thereof;

a di(meth)acrylate ester comprising formula II:

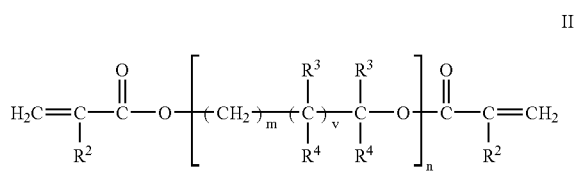

where $R^2$ is hydrogen, halogen, or an alkyl having about 1 to about 4 carbon atoms, $R^3$ is hydrogen, an alkyl having about 1 to about 4 carbon atoms, hydroxyalkyl having about 1 to about 4 carbon atoms or

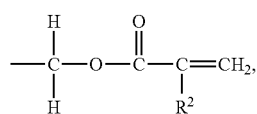

$R^4$ is hydrogen, hydroxy or

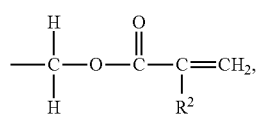

and m is 1 to 8, n is 1 to 20, and v is 0 or 1.

acrylate esters comprising formula III:

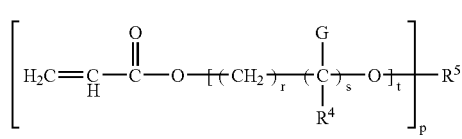

where r is zero or a positive integer, s is zero or 1, t is an integer from 1 to 20, and p is 2, 3 or 4; G and $R^4$ are as defined above; and $R^5$ denotes an organic radical of valency s linked through a carbon atom or carbon atoms thereof to the indicated t number of oxygen atoms. Preferably, r, s, and t are each 1, G is hydrogen or methyl, and $R^5$ is a hydrocarbon residue of an aliphatic polyhydric alcohol having from 2 to 6 carbon atoms, such as a pentaerythrityl group. A specific example of such compounds is pentaerythritoyl tetrakis (dimethylene glycol acrylate);

(meth)acrylate esters comprising formula IV:

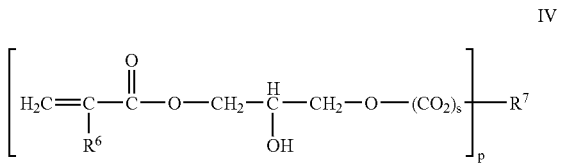

where s and p are as defined above, $R^6$ is hydrogen or methyl, and $R^7$ is an organic radical of valency p, linked through a carbon atom thereof other than the carbon atom of a carbonyl group. More particularly, when s is zero, $R^7$ may denote the residue, containing from 1 to 60 carbon atoms, of an alcohol or phenol having p hydroxyl groups. $R^7$ may thus represent an aromatic, araliphatic, alkaromatic, cycloaliphatic, heterocyclic, or heterocycloaliphatic group, such as an aromatic group containing only one benzene ring, optionally substituted by chlorine, bromine or an alkyl group of from 1 to 9 carbon atoms, or an aromatic group comprising a chain of two to four benzene rings, optionally interrupted by ether oxygen atoms, aliphatic hydrocarbon groups of 1 to 4 carbon atoms, or sulphone groups, each benzene ring being optionally substituted by chloride, bromine or an alkyl group of from 1 to 9 carbon atoms, or a saturated or unsaturated, straight or branched-chain aliphatic group, which may contain ether oxygen linkages and which may be substituted by hydroxyl groups, especially a saturated or monoethylenically unsaturated straight chain aliphatic hydrocarbon group of from 1 to 8 carbon atoms.

Specific examples of such groups are the aromatic groups of the formulae —$C_6H_4C(CH_3)_2C_6H_4$—, in which case p is 2, and —$C_6H_4(CH_2C_6H_3$—$)_w$—$CH_2C_6H_4$—, where w is 1 or 2, in which case p is 3 or 4, and the aliphatic groups of formula —$CH_2CHCH_2$— or —$CH_2CH(CH_2)_3CH_2$—, in which case p is 3, or of formula —$(CH_2)_4$—, —$CH_2CH$=$CHCH_2$—, —$CH_2CH_2OCH_2CH_2$—, or —$(CH_2CH_2O)_2CH_2CH_2$—, in which case p is 2. When s is 1, $R^7$ may represent the residue, containing from 1 to 60 carbon atoms, of an acid having p carboxyl groups, preferably a saturated or ethylenically unsaturated, straight chain or branched aliphatic hydrocarbon group of from 1 to 20 carbon atoms, which may be substituted by chlorine atoms and which may be interrupted by ether oxygen atoms and/or by carbonyloxy (—COO—) groups, or a saturated or ethylenically unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms which may be substituted by chlorine or bromine atoms.

Further preferred compounds where s is 1 include those in which $R^7$ represents a saturated or ethylenically unsaturated straight chain or branched aliphatic hydrocarbon group of from 1 to 8 carbon atoms, optionally substituted by a hydroxyl group, or a saturated or ethylenically unsaturated straight chain or branched aliphatic hydrocarbon group of from 4 to 50 carbon atoms and interrupted in the chain by carbonyloxy groups, or a saturated or ethylenically unsaturated monocyclic or bicyclic cycloaliphatic hydrocarbon group of 6 to 8 carbon atoms, or an ethylenically unsaturated cycloaliphatic-aliphatic hydrocarbon group of from 10 to 51 carbon atoms, or a mononuclear aromatic hydrocarbon group of from 6 to 8 carbon atoms. Specific examples of these carboxylic acid residues are those of formula —CH$_2$CH$_2$—, CH=CH—, and —C$_6$H$_4$— where p is 2. Specific examples of suitable compounds of the preceding formula are epoxy acrylates such as 1,4-bis(2-hydroxy-3(acryloyloxy)propoxy) butane, poly(2-hydroxy-3-(acryloyloxy)propyl)ethers of bis (4-hydroxyphenyl)methane (bisphenol F), 2,2-bis(4-hydroxyphenyl)propane (bisphenol A) and phenol-formaldehyde novolaks, bis(2-hydroxy-3-acryloyloxypropyl) adipate and the methacryloyloxy analogues of these compounds;

urethane acrylates and ureido acrylates comprising formula V:

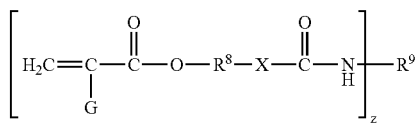

where G is as defined above, R$^8$ denotes a divalent aliphatic, cycloaliphatic, aromatic, or araliphatic group, bound through a carbon atom or carbon atoms thereof indicated at the —O— atom and —X— atom or group, X denotes —O—, —NH—, or —N(alkyl)-, in which the alkyl radical has from 1 to 8 carbon atoms, z is an integer of at least 2 and at most 6, and R$^9$ denotes a z-valent cycloaliphatic, aromatic, or araliphatic group bound through a carbon atom or carbon atoms thereof to the indicate NH groups. Preferably R$^8$ denotes a divalent aliphatic group of 2 to 6 carbon atoms and R$^9$ denotes one of a divalent aliphatic group of 2 to 10 carbon atoms, such as a group of formula: —(CH$_2$)$_6$—, CH$_2$C(CH$_3$)$_2$CH$_2$CH(CH$_3$) (CH$_2$)—, or —CH$_2$CH(CH$_3$) CH$_2$C(CH$_3$)$_2$CH$_2$)$_2$—; or a phenylene group, optionally substituted by a methyl group or a chlorine atom; a naphthylene group; a group of formula: —C$_6$H$_4$C$_6$H$_4$—, —C$_6$H$_4$CH$_2$C$_6$H$_4$—, or —C$_6$H$_4$C(CH$_3$)$_2$C$_6$H$_4$—; or a mononuclear alkylcycloalkylene or alkylcycloalkylalkylene group, such as a methylcyclohex-2,4-ylene, methylcyclohex-2,6-ylene, or 1,3,3-trimethylcyclohex-5-ylenemethyl group. Specific examples include 2,4- and 2,6- (bis(2-acryloyloxyethoxy carbonamido) toluene and the corresponding methacryloyloxy compounds.

The alkylated borohydride and tetraalkyl borane metal or ammonium salt used as initiators of polymerization comprise formula VI:

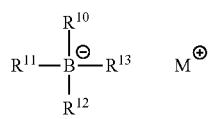

where R$^{10}$ is C$_1$-C$_{10}$ alkyl, straight chain or branched,

R$^{11}$ and R$^{12}$, which may be the same or different, are H, D, C$_1$-C$_{10}$ alkyl or C$_3$-C$_{10}$ cycloalkyl, phenyl, or phenyl-substituted C$_1$-C$_{10}$ alkyl or C$_3$-C$_{10}$ cycloalkyl, provided that any two of R$^{10}$-R$^{12}$ may optionally be part of a carbocyclic ring, R$^{13}$ is H, D or C$_1$-C$_{10}$ alkyl, and M$^+$ is a metal ion or a quaternary ammonium ion comprising formula VII.

The metal ion may be an alkali metal ion such as lithium, sodium, potassium, or cesium, particularly lithium, sodium or potassium, although metallic elements in the second row of the Periodic Table such as barium, magnesium or calcium may be useable, as may transition metals such as copper, iron or cobalt.

The quaternary ammonium ion comprise formula VII below:

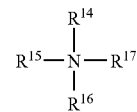

where R$^{14}$-R$^{17}$, which may be the same or different, are C$_1$-C$_{10}$ alkyl, C$_2$-C$_{10}$ alkenyl, C$_3$-C$_{10}$ cycloalkyl, aryl, C$_1$-C$_{10}$ alkylaryl, aryl C$_1$-C$_{10}$ alkyl or aryl C$_1$-C$_{10}$ cycloalkyl, provided that any two of R$^{14}$-R$^{17}$ may be part of an optionally unsaturated carbocyclic ring. Aryl is suitably optionally substituted phenyl, wherein the phenyl ring may be substituted, for example with C$_1$-C$_{10}$ alkyl, particularly C$_1$-C$_6$ alkyl, or halo, particularly Cl, Br or F. Examples of a quaternary ammonium cation include a tetra C$_1$-C$_{10}$ alkylammonium cation, particularly a tetra C$_1$-C$_5$ alkylammonium cation, for example tetramethylammonium, tetraethylammonium or tetra-n-butylammonium, or a tri C$_1$-C$_{10}$ alkylarylammonium cation wherein aryl is phenyl, substituted phenyl (with phenyl being substituted as above), or phenyl-substituted C$_1$-C$_{10}$ alkyl or C$_3$-C$_{10}$ cycloalkyl. Tetramethylammonium cation (i.e., where R$^{14}$-R$^{17}$ in formula VII are each C$_1$ alkyl) is particularly suitable.

In one aspect therefore the invention relates to the use of initiators comprising formula VIII below:

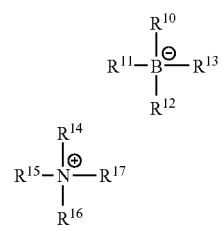

where R$^{10}$-R$^{17}$ are as defined above.

An alkyl group may suitably have 1-6 carbon atoms, for instance 2-4 carbon atoms, and may be straight chain or branched, provided a suitable number of carbon atoms are available for branching. A carbocyclic ring may be bridged by the boron atom.

Suitably at least two, and desirably three, and in some instances four, of R$^{10}$-R$^{13}$ are C$_1$-C$_{10}$ alkyl.

Preferably the alkylated borohydride is of formula VI; M is an alkali metal ion such as lithium, sodium, potassium, or cesium, particularly lithium, sodium or potassium, although metallic elements in the second row of the Periodic Table such as barium, magnesium or calcium may be useable, as may transition metals such as copper, iron or cobalt; R$^{10}$-R$^{12}$ may suitably be the same or different alkyl group and each may suitably be a C$_1$-C$_6$ alkyl group, particularly a C$_2$-C$_4$ alkyl group. Desirably the three alkyl groups R$^{10}$-R$^{12}$ are the same group. A cycloalkyl group may suitably be C$_5$-C$_6$ group.

Examples of suitable metal salts in which R$^1$-R$^3$ are the same alkyl group include lithium triethylborohydride, sodium triethylborohydride, potassium triethylborohydride, lithium tri-sec-butylborohydride, sodium tri-sec-butylborohydride, potassium tri-sec-butylborohydride, lithium tri-siamylborohydride, potassium trisiamylborohydride and lithium triethylborodeuteride. A particularly suitable example is lithium tri-sec-butylborohydride.

An example of a compound in which $R^{11}$ is an alkyl group and $R^{10}$ and $R^{12}$ are H is lithium thexylborohydride. An example of a compound in which $R^{10}$ and $R^{12}$ form part of a cyclic ring is lithium 9-borabicyclo[3.3.1]-nonane ("9BBN") hydride.

Desirably at least one of $R^{11}$ and $R^{12}$ is a $C_1$-$C_{10}$ alkyl group or phenyl, provided that not more than one of $R^{11}$ and $R^{12}$ is phenyl. It will be understood by those skilled in the art that a phenyl group may be substituted in the ring by one or more substituents, which do not affect the activity of the compound of formulae VI or VII as a polymerization initiator. Such ring-substituents include $C_1$-$C_{10}$ alkyl, for example $C_1$-$C_6$ alkyl, particularly methyl.

The above-identified compounds are commercially available from various suppliers such as Aldrich Chemical Co., e.g., under tradenames such as Super-hydride, Selectride, and Super-deuteride, or BASF Corporation (formerly Callery Chemicals), Evans City, Pa., under the trade name CalSelect. Other suitable compounds include the metal borohydrides analogous to the boron compounds as described in the Ritter patents such as diisopinocamphenylborane, dicyclohexylborane, and diisoamylborane.

The quantity of alkylated borohydride or tetraalkyl borane may suitably be such as to provide 0.01% to 5% by weight, particularly 0.01% to 2% by weight, such as 0.1% to 1% by weight, of boron in the total composition. For ease in handling, the alkylated borohydride or tetraalkyl borane is suitably used in a concentration up to about 1.5M, such as about 1M, although persons of skill in the art may choose another suitable concentration depending upon user preference.

The amino silane has at least one amine group and a silicon atom on the same molecule. For instance, aliphatic amino silanes with carbon chain lengths of up to 52 may be used, common examples of which include, aminopropyltrimethoxysilane, aminopropyltriethoxysilane, aminoethylaminopropyltrimethoxysilane and aminoethylaminopropyltriethoxysilane. Specific examples available for purchase include (3-(2-aminoethylamino)propyl)trimethoxy silane, is available from Wacker Corporation under trade designation GF 91 or General Electric Corporation under the tradename SILQUEST, such as A1120; 3-aminopropyl triethoxysilane, available commercialy from GE as SILQUEST A1100; and bis-silanes such as bis-(3 (trimethoxysilyl)dipropylamine and longer chain aminosilanes, such as GP 657, available commercially from Genesee Polymers, Flint, Mich.

In addition, other amino silanes available for purchase include Shin-Etsu Chemical Co., Ltd, such as N-2(aminoethyl)₃-aminopropylmethyldimethoxysilane (KBM-602), N-2 (aminoethyl)₃-aminopropyltrimethoxysilane (KBM-603), N-2(aminoethyl)₃-aminopropyltriethoxysilane (KBE-603), 3-aminopropyltrimethoxysilane (KBM 903), 3-aminopropyltriethoxysilane (KBE-903), 3-triethoxysilyl-N-(1,3-dimethyl-butyliden)propylamine (KBE-9103), N-phenyl-3-aminopropyltrimethoxysilane (KBM-573) and N-(vinylbenzyl)-2-aminoethyl-3-aminopropyltrimethoxysilanehydrochloride (KBM-575), and those from Degussa's Sivento division, such as a proprietary aminofunctional silane composition (called DYNASYLAN® 1126), an oligomeric diaminosilane system (called DYNASYLAN® 1146), N-vinylbenzyl-N'-aminoethyl-e-aminopropylpolysiloxane (DYNASYLAN® 1175), N-(n-butyl)-3-aminopropyltrimethoxysilane (DYNASYLAN® 1189), a proprietary aminofunctional silane composition (called DYNASYLAN® 1204), N-(2-aminoethyl)-3-aminopropylmethyldimethoxysilane (DYNASYLAN® 1411), 3-aminopropylmthyldiethoxysilane (DYNASYLAN® 1505), 3-aminopropylmethyldiethoxysilane (DYNASYLAN® 1506), 3-aminopropyltriethoxysilane (DYNASYLAN® AMEO), a proprietary aminosilane composition (called DYNASYLAN® AMEO-T), 3-aminopropyltrimethoxysilane (DYNASYLAN® AMMO), N-2-aminoethyl-3-aminopropyltrimethoxysilane (DYNASYLAN® DAMO), N-(2-aminoethyl)-3-aminopropyltrimethoxysilane (DYNASYLAN® DAMO-T) and a triamino-functional propyltrimethoxysilane (called DYNASYLAN® TRIAMO).

The amino silane capped polymer embraces polymers with backbones such as acrylic, urethane, siloxane, and polyester, provided that when the silane is a siloxane, does not contain pendant polymerizable groups. Examples include monoamino siloxanes, diamino siloxanes and polyamino siloxanes, provided none of the amino siloxanes have pendant functional groups capable of polymerization.

The amino silane capped polymer may be embraced by:

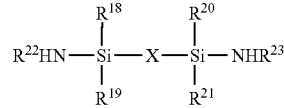

where $R^{18}$, $R^{19}$, $R^{20}$ and $R^{21}$ may be the same or different and are selected from hydrogen, alkyl, alkoxy, aryl or aryloxy; $R^{22}$ and $R^{23}$ may be the same or different and are selected from hydrogen, alkyl and aryl; and X is selected from alkylene, alkenylene, arylene, with or without interruption by a heteroatom; urethanes; polyethers; polyesters or polyacrylates.

A diamino siloxane, for instance, may be embraced by:

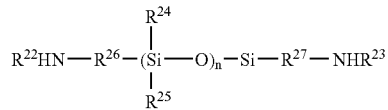

where $R^2$ and $R^{27}$ may be the same or different and are selected from alkylene, arylene, alkylene oxide, arylene oxide, alkylene esters, arlyene esters, alkylene amides or arylene amides; $R^{24}$ and $R^{25}$ may be the same or different and are selected from alkyl or aryl; $R^{22}$ and $R^{23}$ are as defined above and n is 1-1,200.

Certain amino-modified silicone fluids that are commercially available from Shin-Etsu under the trade designations KF857, KF858, KF859, KF861, KF864 and KF880 may be useful herein. In addition, Wacker Silicones offers commercially a line of amino-functional silicone fluids designated as L650, L651, L653, L654, L655 and L656, and an amino-functional polydimethylsiloxane under the tradename WACKER FINISH WR 1600 that may be useful herein.

The quantity of amino silane or amino silane capped polymer may suitably be in the range from about 2% to about 50% by weight, for example, 2% to 40% by weight, particularly 2% to 30% by weight, of the total composition.

The alkylated borohydride or tetraaklyl borane metal or ammonium salt and amino silane or amino silane capped polymer are suitable for packaging together in part B—the initiator component—of a two-part polymerizable composition.

In a further aspect of the invention, there is provided an indication system for use in moderating the cure speed of the adhesive system as well as determining when the cure is complete.

The indicator system is substantially dissolved in the composition, particularly the (meth)acrylate portion thereof (part A), to provide a first color to the (meth)acrylate component, where after mixing with the initiator portion (part B) for a pre-determined amount of time, the composition undergoes a color change as an indication that cure is beginning to occur.

For instance, as reported in H. C. Brown, *Boranes in Organic Chemistry*, Cornell University Press, 433-39 (1972), the disclosure of which being expressly incorporated herein by reference, 5 mole percent iodine inhibits the rate of oxygen absorption by tri-n-butyl borane for 12.5 minutes at 0° C., and tris-(2-methyl-1-pentyl)borane inhibits oxygen absorption for 32 minutes. See supra at 435.

The inclusion in the inventive polymerizable composition of the indicator system, such as one based on iodine, provides the ability to control the rate of oxygen absorption which translates into rate of polymerization, as well as the ability to monitor when polymerization is complete, as the indictor system assumes one color initially in the uncured composition and a second color once polymerization is complete.

The polymerizable composition may suitably be a two-part composition in which the free-radically polymerizable monomer component is provided in one part and an alkylated borohydride or tetraaklyl borane metal or ammonium salt is provided in the other part. Alternatively, the alkylated borohydride or tetraaklyl borane metal or ammonium salt may be provided as a primer, where the alkylated borohydride or tetraaklyl borane metal or ammonium salt is applied to a substrate separately from the adhesive composition.

In a still further aspect the invention provides a two-part polymerizable composition, which includes:

part A—(meth)acrylate component, optionally with an acid; and part B—an effective amount of a polymerization initiator comprising an alkylated borohydride or tetraaklyl borane metal or ammonium salt as defined herein, and an amino silane, or an amino silane capped polymer.

Either part A, part B, or both may further include a toughener, filler and/or thickener, though desirably part A includes a thickener, such as acrylonitrile butadiene rubber, and each of part A and B includes a silica component.

An acid, when added, may be a weak acid, such as having a pKa no lower than about 0.5 with the desirable limit being about 0.9. The upper limit normally is about 13, or less, such as about 11.5. Carboxylic acids, which have a pKa of up to about 8, such as about 6 or about 7, are particularly useful. An effective amount of the acid, is about 0.1 to about 25%, preferably from about 0.1 to about 20%, and more preferably from about 0.5 to about 10% based on a total weight of the (meth)acrylate composition.

Suitable acids may be monobasic or polybasic. Examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid, and saccharin.

Lewis acids may also be used. The acid may also be present as a latent acid, particularly a masked carboxylic acid compound hydrolyzable on contact with moisture, such as an acid anhydride, such as described in European Patent No. EP 356 875 and U.S. Pat. No. 5,268,436, the contents of which are incorporated herein by reference.

While alkylated borohydride or tetraaklyl borane metal or ammonium salts are effective initiators without an acid, the inclusion of an acid (which term includes a latent acid) together with the free radical polymerizable monomer component is desirable. For certain substrates and/or certain polymerization speeds, the presence of an acid may be required. In the case of a two-part composition, the reaction takes place after mixing of the two parts, one containing the alkylated borohydride or tetraaklyl borane metal or ammonium salt and the other containing the acid or other Compound reactive therewith.

Moisture is excluded from contact with the alkylated borohydride or tetraaklyl borane metal or ammonium salts until polymerization has been initiated. Suitably, at least part B of the two-part polymerizable composition is packaged in a moisture-free and moisture-impermeable applicator or other container.

Further the invention provides a method for bonding a substrate to a similar or different substrate, where the method comprises applying an adhesive composition as defined above to at least one of the substrates, bringing the substrates together and allowing the composition to cure. In one aspect, the invention provides a method as defined above for bonding a low surface energy substrate, such as a polyolefin substrate, to a similar or different substrate.

In particular the invention provides a method for bonding a substrate, particularly a low surface energy substrate, to a similar or different substrate, where the method includes mixing parts A and B of a two part polymerizable composition prior to use in order to initiate polymerization, applying the mixed composition to at least one of the substrates, bringing the substrates together and allowing the composition to cure by completion of the polymerization initiated on mixing of the parts A and B.

As noted, tougheners may be added. Suitable tougheners include elastomeric materials such as polybutadiene rubbers, polyisoprene, available under the trade name KRATON® from Shell Chemical Corp., Houston, Tex., acrylonitrile butadiene rubber, available under the tradename NIPOL 1072, acrylonitrile-butadiene-styrene ("ABS"), available under the trade name HYCAR®, or as core-shell polymers under the trade name BLENDEX®, or polystyrenes.

For bonding polyolefins, it is desirable to use a core-shell polymer. The use of core-shell polymers in (meth)acrylate compositions is described, for example, in U.S. Pat. Nos. 4,536,546 and 4,942,201, the disclosures of each of which are hereby expressly incorporated therein by reference. Core shell polymers are suitably graft copolymer resins, e.g., ABS graft copolymers, or others described in the '546 and '201 patents, in the form of particles that comprise rubber or rubber-like cores or networks that are surrounded by relatively hard shells. In addition to improving the impact resistance of the bond, core-shell polymers can also impart enhanced spreading and flow properties to the composition. These enhanced properties include a reduced tendency for the composition to leave an undesirable "string" upon dispensing from a syringe-type applicator, or sap or slump after having been applied to a vertical surface. The quantity of toughener, when used, may suitably be in the range from about 1% to about 40%, preferably about 5% to about 25%, based on a total weight of the composition.

Polymeric thickeners may be present in the compositions in an amount up to about 50%, and may be polymers or prepolymers of low or high molecular weight. Suitable polymeric thickeners are a commercially available methacrylate polymer sold under the trademark ELVACITE®, available from E.I. DuPont de Nemours, Wilmington, Del., as well as styrene-methyl methacrylate copolymers, polybisphenol A maleate, or propoxylated bisphenol-A-fumarate polyester sold under the trademark ATLAC®.

Inert fillers, such as finely divided silica, fumed silica (treated or untreated), montmorillonite, clay, bentonite and the like, may also be added. The use of micronized silica can result in a paste-like thixotropic composition. Polymeric thickeners or other thickeners such as silica may suitably be present as a thickener in both parts A and B of a two-part polymerizable composition. Inert fillers such as wood flour, cornstarch, glass fibers, cotton lintners, mica, alumina, silica, teflon and the like may be used to alter physical properties, such as modifying viscosity, improving impact resistance, and the like. Such fillers may be incorporated in the inventive compositions in an amount within the range of from about 0.5% to about 20%, for example about 1% to about 10%, by weight of the composition.

It is a particular advantage of the invention that polyolefin and other low surface energy materials can be used as fillers in the composition. Polyolefin powders such as polyethylene powder are relatively inexpensive. In a composition which readily bonds to a polyolefin, the filler becomes securely adhered into the cured composition. Polyethylene or polypropylene powders can be used with particle sizes in the range from about 0.01 microns to about 1 micron, particularly about 0.02 microns to about 0.3 microns, allowing for a good control of the gap between substrates, i.e., the depth of adhesive. Particularly suitable polyethylene powders are commercially available under the trade name MICROTHENE® available from Equistar Chemicals LP, Houston, Tex. Polyethylene flock and polyolefin chopped fibers can also be used as fillers. The amount of polyolefin filler that may be used in the present invention, is about 0.5% to about 20%, preferably about 1% to about 10% based on a total weight of the composition.

In the two part polymerizable composition of the present invention, parts A and B may be provided in a weight ratio in the range from about 1:10 to 10:1, preferably, about 1:5 to 1:1, more preferably from about 1:2 to 1:1, and even more preferably, from about 8:10 to about 10:8. Advantageously, the two part polymerizable composition is provided in about a 1:1 ratio of parts A and B for simple consumer use.

Commercially available acrylic adhesive compositions for bonding low surface energy substrates, such as 3M's Scotch-Weld™ DP 8005, are currently dispensed in a volume ratio of 1:10 (the volume ratios and weight ratios not being significantly different). It is desirable to be able to dispense a two-part composition in approximately equal volumes of each part. This is easier for the end user and has general appeal from the customer point of view.

The composition may optionally include oxidizing agents, reducing agents, thickeners, non-reactive dyes and pigments, reaction indicators (as noted), fire retarders, stabilizers, such as quinones and hydroquinones, thixotropes, plasticizers and antioxidants. The optional additives are used in an amount that does not significantly adversely affect the polymerization process or the desired properties of polymerization products made thereby.

The invention is more fully illustrated by way of the examples that follow below.

EXAMPLES

Example 1

A two part composition in accordance with the invention was prepared as follows:

Part A was prepared using the following components in the noted weight percentages: tetrahydrofurfuryl (meth acrylate, 67.5%, acrylonitrile butadiene rubber (NIPOL 1072), 17.5%, acrylic acid, 6%, glass beads (250-450 um), 5%, and hydrophobic silica (AEROSIL 202), 5%.

Part B was prepared by adding at room temperature lithium triethyl borohydride (1M in THF), 37.5% to 3-aminopropyl triethoxy silane (SILQUEST A1100), 57.5%, thickened with hydrophilic silica (AEROSIL 200), 5%.

Next, Part A was mixed into Part B in a 10:1 ratio and dispensed into aluminum dishes. Polymerization was observed to occur immediately, with full cure confirmed after 3 days.

A composition of Part A and Part B was also used to bond a polyethylene lap shear to a steel lapshear. Once cure was complete, bond strength was observed in the over 4 MPas range.

Reference to FIG. 1 shows the improvement in humid aging resistance on replacing an aziridine with an amino silane in otherwise comparable compositions. That is, the compositions are as described above except that instead of the amino silane an aziridine [triemethylolpropene tris(2-methyl-1-aziridine propionate) (CAS No. 64265-57-2)] is used.

The improvement is not only apparent after forming the bond, but after about 250 hours under 60° C. and 95% RH conditions. Whereas the aziridine-containing system began a precipitous decline in bond strength, the amino silane-containing system not only maintained its bond strength, but actually showed a slight improvement over time.

What is claimed is:
1. A polymerizable composition for bonding a low surface energy substrate to a similar or different substrate, comprising:
 a) at least one free-radically polymerizable monomer component, and
 b) an effective amount of an initiator system for initiating polymerization of the free-radically polymerizable monomer, said initiator system comprising:
  alkylated borohydride or tetraalkyl borane metal or ammonium salts comprising formula VI below:

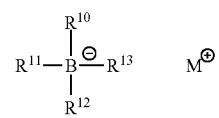

VI wherein $R^{10}$ is $C_1$-$C_{10}$ alkyl,
 $R^{11}$ and $R^{12}$, which may be the same or different, are selected from the group consisting of H, D, $C_1$-$C_{10}$ alkyl, $C_3$-$C_{10}$ cycloalkyl, phenyl, phenyl-substituted $C_1$-$C_{10}$ alkyl and phenyl-substituted $C_3$-$C_{10}$ cycloalkyl, provided that any two of $R^{10}$-$R^{12}$ may optionally be part of a carbocyclic ring,
 $R^{13}$ is H, D or $C_1$-$C_{10}$ alkyl, and
 $M^+$ is a metal ion or a quaternary ammonium ion comprising formula VII below

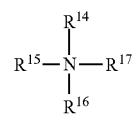

VII wherein $R^{14}$-$R^{17}$, which may be the same or different, are selected from the group consisting of $C_1$-$C_{10}$ alkyl, $C_2$-$C_{10}$ alkenyl, $C_3$-$C_{10}$ cycloalkyl, aryl, $C_1$-$C_{10}$ alkylaryl, aryl $C_1$-$C_{10}$ alkyl and aryl $C_1$-$C_{10}$ cycloalkyl, provided that any two of $R^{14}$-$R^{17}$ may be part of an optionally unsaturated carbocyclic ring; and c) a carrier comprising an amino silane or an amino silane capped polymer.

2. A composition according to claim 1, which is a two-part composition in which the free-radically polymerizable monomer component is provided in one part and the initiator system is provided in the other part.

3. A composition according to claim 1, which is a two-part composition in which the free-radically polymerizable monomer component comprises at least one (meth)acrylate monomer which is provided in both parts and the initiator system is provided in one part.

4. A two-part polymerizable adhesive composition according to claim 3, comprising:
part A) an effective amount of an initiator system and an amino silane or an amino silane capped polymer; and
part B) at least one (meth)acrylate monomer, optionally with one or more of a toughener, acid, filler and thickener.

5. A two-part polymerizable adhesive composition according to claim 3, comprising:
part A) an effective amount of an initiator system, an amino silane or an amino silane capped polymer, and at least one (meth)acrylate monomer, optionally with one or more of a toughener, filler and thickener, but without any compound that is reactive with the initiator system to free an alkylated borohydride or tetraalkyl borane metal or ammonium salt therefrom; and
part B) at least one (meth)acrylate monomer together with a compound reactive with an initiator system to free an alkylated borohydride or tetraalkyl borane metal or ammonium salt therefrom and optionally with one or more of a toughener, filler and thickener.

6. A composition according to claim 1, wherein three of $R^1$-$R^4$ of the alkylated borohydride of formula VI are the same $C_1$-$C_{10}$ alkyl group and one of $R^1$-$R^4$ is phenyl or phenyl-substituted $C_1$-$C_{10}$ alkyl.

7. A composition according to claim 1, wherein three of $R^1$-$R^4$ of the alkylated borohydride of formula VI are the same $C_2$-$C_4$ alkyl group and one of $R^1$-$R^4$ is phenyl.

8. A composition according to claim 1, wherein each of $R^5$-$R^8$ of the quaternary ammonium ion of formula VII is the same $C_1$-$C_5$ alkyl group.

9. A composition according to claim 1, wherein the initiator system comprises:

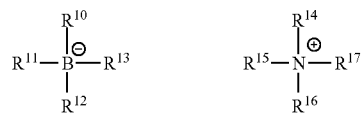

wherein $R^{10}$-$R^{12}$ are each the same $C_1$-$C_6$ alkyl group,
$R^{13}$ is phenyl;
$R^{14}$-$R^{17}$ are each the same $C_1$-$C_6$ alkyl group.

10. A composition according to claim 1, wherein the initiator system is used in an amount sufficient to provide 0.01% to 5% by weight of boron in the total composition.

11. A composition according to claim 1, wherein the amino silane is a member selected from the group consisting of aminopropyltrimethoxysilane, aminopropyltriethoxysilane, aminoethylaminopropyltrimethoxysilane and aminoethylaminopropyltriethoxysilane.

12. A composition according to claim 1, wherein the amino silane is 3-aminopropyl triethoxy silane.

13. A composition according to claim 1, wherein the amino silane is an amino silane capped polymer.

14. A composition according to claim 13, wherein the amino silane capped polymer is an amino siloxane selected from the group consisting of monoamino siloxanes, diamino siloxanes and polyamino siloxanes, provided none of the amino siloxanes have pendant functional groups capable of polymerization.

15. A composition according to claim 13, wherein the amino silane capped polymer is embraced by:

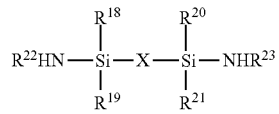

wherein $R^{18}$, $R^{19}$, $R^{20}$ and $R^{21}$ may be the same or different and are selected from the group consisting of hydrogen, hydroxyl, alkyl, alkoxy, alkenyl, alkenyloxy, aryl, and aryloxy; $R^{22}$ and $R^{23}$ may be the same or different and are selected from the group consisting of hydrogen, alkyl and aryl; and X is selected from alkylene, alkenylene, arylene, with or without interruption by a heteroatom; urethanes; polyethers; polyesters; polyacrylates; polyamides; and polyimides.

16. A composition according to claim 14, wherein the diamino siloxane is embraced by:

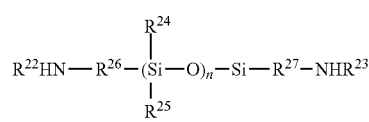

wherein $R^{26}$ and $R^{27}$ may be the same or different and are selected from the group consisting of alkylene, arylene, alkylene oxide, arylene oxide, alkylene esters, arlyene esters, alkylene amides and arylene amides; $R^{24}$ and $R^{25}$ may be the same or different and are selected from the group consisting of alkyl and aryl; $R^{22}$ and $R^{23}$ are as defined above and n is 1-1,200.

17. A composition according to claim 1, wherein the amino silane is a member selected from the group consisting of N-2(aminoethyl)-3-aminopropylmethyldimethoxysilane, N-2(aminoethyl)-3-aminopropyltrimethoxysilane, N-2(aminoethyl)-3-aminopropyltriethoxysilane, 3-aminopropyltrimethoxysilane, 3-aminopropyltriethoxysilane, 3-triethoxysilyl-N-(1,3-dimethyl-butyliden)propylamine, N-phenyl-3-aminopropyltrimethoxysilane, N-(vinylbenzyl)-2-aminoethyl-3-aminopropyltrimethoxysilanehydrochloride, N-vinylbenzyl-N'-aminoethyl-e-aminopropylpolysiloxane, N-(n-butyl)-3-aminopropyltrimethoxysilane, N-(2-aminoethyl)-3-aminopropylmethyldimethoxysilane, 3-aminopropylmethyldiethoxysilane, 3-aminopropyltrimethoxysilane, N-2-aminoethyl-3-aminopropyltrimethoxysilane, N-(2-aminoethyl)-3-aminopropyltrimethoxysilane and triaminofunctional propyltrimethoxysilane.

18. A method for bonding together substrates, at least one of which is constructed of a low surface energy material, the steps of which comprise:
applying a composition according to claim 1 to at least one of the substrates,
bringing the substrates together with the composition, and allowing the composition to cure.

19. A method for bonding together substrates, at least one of which is constructed of a low surface energy material, the steps of which comprise:

mixing parts A and B of a two part adhesive composition according to claim 3 prior to use in order to initiate polymerization, applying the mixed adhesive composition to at least one of the substrates, bringing the substrates together with the composition, and allowing the composition to cure by completion of the polymerization initiated on mixing of the two parts A and B.

20. A cured adhesive composition comprising the polymerization product of a composition according to claim 1.

21. A bonded article comprising two substrates bonded by the polymerization product of a composition according to claim 1.

22. A bond formed between two substrates by the polymerization product of a composition according to claim 1.

23. A composition according to claim 1 further comprising a cure indicator.

24. A composite article comprising a first substrate and a second substrate bonded to the first substrate by an acrylic adhesive, wherein the acrylic adhesive comprises the polymerization product of a composition according to claim 1.

25. A composition according to claim 1, which when polymerized to bond together two substrates and exposed for 250 hours under 60° C. and 95% RH the polymerized composition at least maintains bond strength.

* * * * *